(No Model.) 2 Sheets—Sheet 1.

O. TÜRCKE.
GEARING FOR SPRING VEHICLES, ESPECIALLY FOR STREET WATERING CARTS.

No. 424,235. Patented Mar. 25, 1890.

Witnesses:
Inventor:

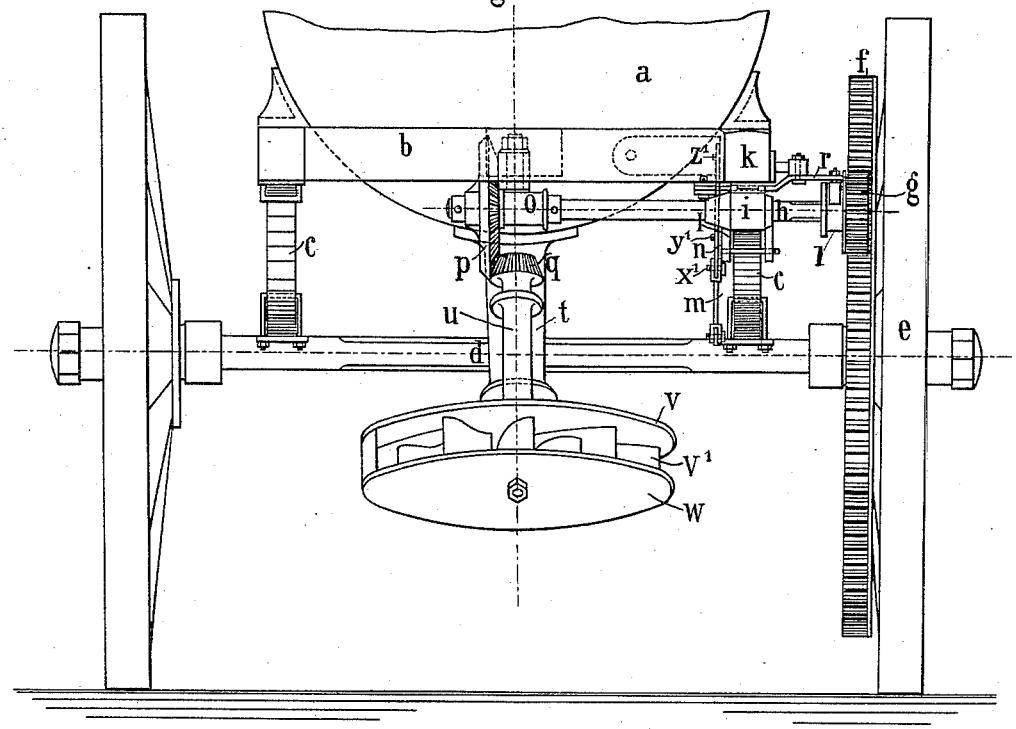

United States Patent Office.

OTTO TÜRCKE, OF DRESDEN, SAXONY, GERMANY.

GEARING FOR SPRING-VEHICLES, ESPECIALLY FOR STREET-WATERING CARTS.

SPECIFICATION forming part of Letters Patent No. 424,235, dated March 25, 1890.

Application filed August 10, 1888. Serial No. 282,446. (No model.)

*To all whom it may concern:*

Be it known that I, OTTO TÜRCKE, a subject of the King of Saxony, residing at Dresden, Kingdom of Saxony, Germany, have invented a certain new and useful Improvement in Gearing for Spring-Vehicles, intended more particularly for Street-Watering Carts, of which the following is a specification.

This invention relates to improvements in means for transmitting the rotary movement of the wheel or wheels of a vehicle, as a street-watering cart, to any device or part to be put in rotary motion in or on the cart, as is the case, for instance, in watering-carts, in which the water is scattered by quickly-revolving wheels or similar devices over a large area of the street. If this rotary movement is derived from the cart-wheels directly by spur-wheel gearing, (avoiding the employment of chain transmission and as far as possible the employment of bevel-wheels,) there is a tendency to a disturbance of the relations of pitch-lines between those two gear-wheels, of which one gear-wheel is carried by the cart-wheel, and is therefore independent of the cart-springs, and the other carried by the cart-frame, and therefore partakes of the vertical movement of the cart due to the action of the springs. The change of the positions of the two spur-wheels may arise from variations of loads upon the cart or from sudden shocks or vibrations of the loads, or from both causes combined. Any considerable change of the contact of the pitch-lines may be the cause of serious disturbances or even breakage of the machinery. My invention is intended to keep the contact of pitch-lines between the two gear-wheels constant.

The accompanying drawings form a part of this specification and represent what I consider the best means of carrying out the invention.

Figure 1:
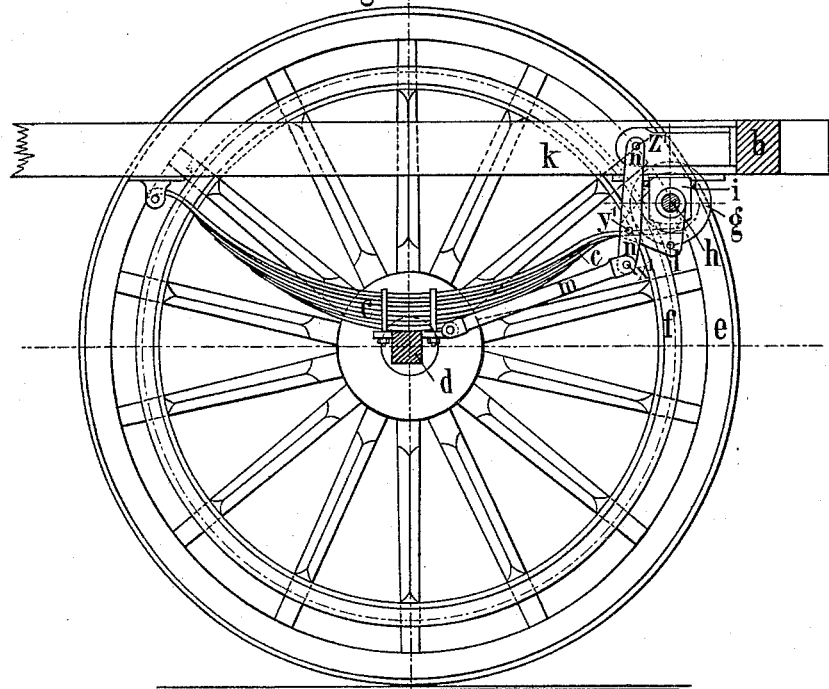
Figure 3:
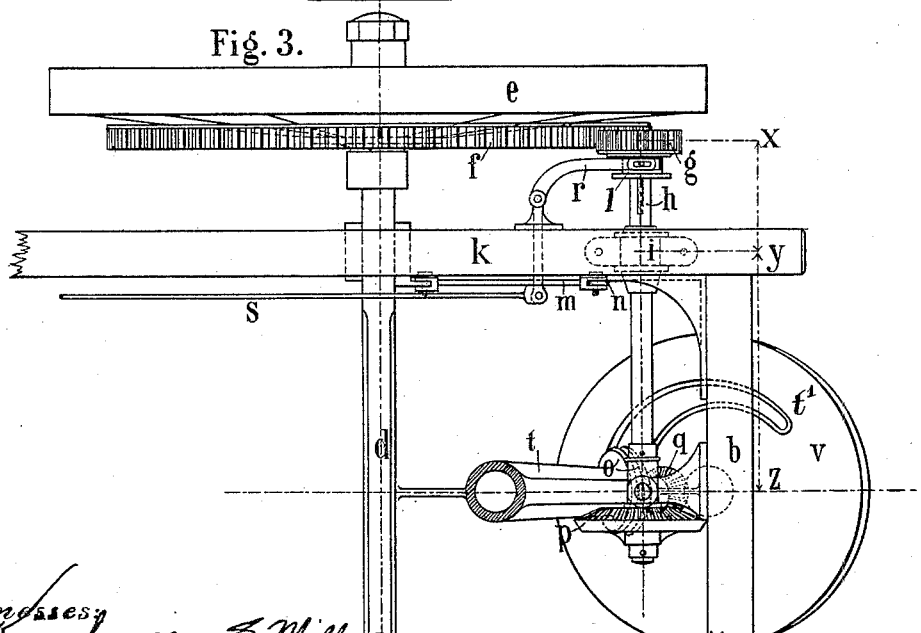

Figure 1 is a side view, Fig. 2 an end view, and Fig. 3 a ground plan, of a watering-cart having my invention applied.

The drawings show the novel parts with so much of the ordinary parts as is necessary to show their relation thereto.

Similar letters of reference indicate corresponding parts in all the figures where they occur.

The reservoir $a$ and cross-frame $b$ rest partly by means of springs $c$ upon the hind axle $d$ of the cart. One of the hind wheels $e$ is provided with a toothed wheel $f$, taking into the wheel or pinion $g$. The contact of pitch-lines of these two spur-wheels $f$ and $g$ should remain unchanged under varying loads upon the springs and under vibrations of the loads. The shaft $h$, which receives rotary motion by its wheel or pinion $g$ from the spur-wheel $f$, is supported in a bearing $i$, which is arranged at the under side of the longitudinal frame-beam $k$. Against the lower surface of this bearing $i$ the free end of the spring $c$ bears, which spring, as it is extended and contracted in action, may slide thereunder. The spring in such sliding movement is guided between two plates fixed to said bearing. The bearing $i$ is also capable of sliding longitudinally of the framing. The provisions for controlling such movement independent of the motion of the spring are as follows: A lever $n$, pivoted to the framing $k$, engages the box $i$ by the pin $y'$, and a link $m$ connects by one end to the axle $d$ and by its other end to the lever $n$. The position of the pin $y'$ being in due proportion, each up-and-down movement of the beam $k$ under the action of the spring $c$ will cause a shifting of the bearing $i$ in longitudinal direction of the beam $k$. Such shifting will be forward when the beam rises, while it will be backward when the beam descends, and the motion will always be such that the exact proper contact of pitch-lines between $f$ and $g$ is maintained. In order to allow such shifting of the wheel or pinion $g$ with its bearing $i$, the other end of the axle $h$ is mounted in a jointed bearing, which is capable of turning around its vertical axle. The distances in the length of the lever $x'$ $y'$ $z'$ should be proportioned to the distances $x$ $y$ $z$ in the length of the axle $h$. The engagement of the bevel-wheel $p$ on this end of the axle $h$ into the bevel-wheel $q$ on the axle of the centrifugal wings $v'$ is obviously not much disturbed by the alteration in the position of the axle $h$, caused by the shifting of the bearing $i$. A friction-clutch or some other convenient clutch (not shown) connects the pinion $g$ to a longitudinally-sliding sleeve $l$, feathered on the shaft $h$.

I provide a lever $r$ and a connecting-rod $s$, operated by the attendant at will for throwing the wheel or pinion $g$ in or out of engagement with the sleeve $l$, and consequently with the axle $h$.

The improved mechanism above described for transmitting the rotary motion of the cart-wheel is combined with a centrifugal device for watering purposes. (See Figs. 2 and 3.) This device consists of a centrifugal wheel $v'$, provided with curved blades and fixed upon the axle or shaft carrying the bevel-wheel $q$, said axle being mounted in the sleeve or bearing $u$, which is fixed to the cart-frame. The centrifugal wheel $v'$ is rotated at a high velocity between the two disks $v$ and $w$, which are fixed to the sleeve $u$, the water from the reservoir $a$ being led by the pipe $t$ between the two disks $v$ and $w$, being supplied through the curved passage $t'$ to that portion of the wheel $v'$ which is moving rearward. It is caught by the blades of the centrifugal wheel $v'$ and spread rearward by this wheel in the form of rain or spray over a large area of the street or other surface to be watered. All the water in its divided state is thrown to the rear and away from the cart.

I claim—

1. In vehicles in which the rotary movement of a bearing-wheel is transmitted to another rotating device mounted on the carriage-frame $b$ $k$, the movable wheel or pinion $g$, carried by the frame and rotated by the toothed wheel $f$, mounted on one of the bearing-wheels $e$, in combination with each other and with the movable bearing $i$, link $m$, connected to the frame and axle, as shown, and lever $n$, proportioned, as shown, so that the extent of shifting the bearing $i$ shall correspond to the temporary or permanent increase or decrease of the load and the position of the pitch-lines between $f$ and $g$ shall be maintained, all substantially as herein specified.

2. The bearing $o$, for the inner end of the axle $h$, capable of turning, as shown, in combination with the pinion $g$, mounted on the axle $h$, and with the gear-wheel $f$, carried on the wheel $e$, and with the movable bearing $i$ on the said axle, the link $m$, and lever $n$, connected to the axle and frame and to each other, and all the parts being proportioned and arranged for joint operation, substantially as herein specified.

In testimony that I claim the foregoing as my invention I have signed my name in presence of two subscribing witnesses.

OTTO TÜRCKE.

Witnesses:
PAUL DRUCKMÜLLER,
WILHELM WIESENHÜTTER.